United States Patent [19]

Schwab et al.

[11] Patent Number: 5,334,651

[45] Date of Patent: Aug. 2, 1994

[54] WATER-THINNABLE TWO-COMPONENT COATING PREPARATION, A PROCESS FOR ITS PREPARATION, AND ITS USE

[75] Inventors: Michael Schwab, Niedernhausen; Udo Frank, Ingelheim; Gerd Walz, Wiesbaden, all of Fed. Rep. of Germany

[73] Assignee: Hoechst Aktengesellschaft, Fed. Rep. of Germany

[21] Appl. No.: 36,024

[22] Filed: Mar. 23, 1993

[30] Foreign Application Priority Data

Mar. 25, 1992 [DE] Fed. Rep. of Germany ....... 4209677
Jun. 4, 1992 [DE] Fed. Rep. of Germany ....... 4218449

[51] Int. Cl.$^5$ ............................................ C08L 75/04
[52] U.S. Cl. ................................. 524/591; 528/49; 528/60; 528/65
[58] Field of Search ............... 524/591; 528/49, 60, 528/65

[56] References Cited

U.S. PATENT DOCUMENTS 4,791,168  12/1988  Salatin et al. ................. 524/601

FOREIGN PATENT DOCUMENTS 0436941  1/1990  European Pat. Off. .
0496205  4/1990  European Pat. Off. .
0469389  7/1990  European Pat. Off. .
3903804  2/1989  Fed. Rep. of Germany .
PCT/EP920-
  0560   8/1989  PCT Int'l Appl. .

Primary Examiner—Maurice J. Welsh
Attorney, Agent, or Firm—Bierman and Muserlian

[57] ABSTRACT

Water-thinnable two-component coating preparation, comprising
a) a polyisocyanate component comprising one or more organic polyisocyanates, and
b) a polyurethane resin prepared by
  1. reacting
    (A) polyisocyanates with
    (B) polyols having an average molecular weight $M_n$ of at least 400,
    (C) optionally low molecular weight polyols and
    (D) compounds having at least two groups which are reactive toward isocyanate groups and at least one group which is capable of anion formation,
  to give a prepolymer containing free NCO groups and
  2. reacting the prepolymer prepared in step 1 with at least one of the components:
    (E) low molecular weight polyols carrying no further groups which are reactive toward isocyanate groups, these compounds being employed in excess;
    (F) compounds which are monofunctional or contain active hydrogen of differing reactivity, and are different from (E), and optionally
    (G) compounds which are different from (B), (C), (D), (E) and (F) and contain at least two groups which react with NCO groups.

11 Claims, No Drawings

WATER-THINNABLE TWO-COMPONENT COATING PREPARATION, A PROCESS FOR ITS PREPARATION, AND ITS USE

The invention relates to a water-thinnable two-component coating preparation based on polyurethane resins, to a process for its preparation and to its use as a coating composition.

The changeover from conventional paints to water-thinnable systems is proceeding at full pace. In 1-component systems in particular, the replacement of conventional by aqueous binders has already made considerable progress.

The replacement of solvent-containing binders in high-quality 2-component systems presents difficulties. Especially in chemically crosslinking polyurethane paints, which, due to their outstanding properties, are of great importance in the coatings sector, it has not previously been possible to dispense with organic solvents. The use of aqueous binders appeared problematic since the polyisocyanate compounds employed as curing agents react with water, forming N-substituted polyurea compounds and giving off carbon dioxide.

It is known from EP 0 358 979 that specific polyhydroxypolyacrylates are capable of emulsifying the polyisocyanate curing agents in water and of curing to give crosslinking films.

Two-component dispersions based on polyurethanes and polyisocyanates are already known from EP-A-0 469 389. However, the polyisocyanates contained therein as the second component must per se be dispersible in water. This water-dispersibility is achieved by modifying the polyisocyanates with hydrophilic ethylene oxide groups and anionic groups. It has now been found that, surprisingly, in such two-component systems based on polyurethanes and polyisocyanates, the polyisocyanate component need not be given a hydrophilic modification; in other words, the polyisocyanates which are not water-dispersible can be directly employed here.

It has now been found that, surprisingly, selected water-thinnable polyurethane resins, described in more detail below, represent particularly favorable combination partners with an excellent emulsifying action for uncapped polyisocyanate curing agents which are not water-dispersible per se. Some of these polyurethane resins are described in EP-A-355 682, but this discloses solely their use in one-component filler compositions. The aqueous 2-component polyurethane paints based on these resins dry to give hard, crosslinked films which are free from defects and, as regards their properties, correspond to conventional 2-component polyurethane paints.

The invention therefore relates to a water-thinnable two-component coating preparation, comprising
a) a polyisocyanate component comprising one or more organic polyisocyanates, and
b) a polyurethane resin prepared by
  1. reacting
     (A) polyisocyanates with
     (B) polyols having an average molecular weight $M_n$ of at least 400,
     (C) optionally low molecular weight polyols and
     (D) compounds having at least two groups which are reactive toward isocyanate groups and at least one group which is capable of anion formation, are ultimately obtained, any solvent still present in the polymer dispersions or solutions also being included in the calculation. Solvents which are suitable as additives to the polyisocyanates are for example aromatic hydrocarbons such as solvent naphtha, or else solvents of the type already stated above by way of example.

Polyisocyanates suitable as component a) are diisocyanates and, in particular, the so-called "paint polyisocyanates" with isocyanate groups attached to aromatic or (cyclo) aliphatic structures, the latter aliphatic polyisocyanates being particularly preferred.

The diisocyanates which are suitable are compounds which are known in the polyurethane and paints sector, such as aliphatic, cycloaliphatic or aromatic diisocyanates. These are preferably of the formula $Q(NCO)_2$, where Q is a hydrocarbon radical having 4 to 40 carbon atoms, in particular 4 to 20 carbon atoms and is preferably an aliphatic hydrocarbon radical having 4 to 12 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms. Examples of such diisocyanates which are to be employed with preference are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4'-diisocyanatodicyclohexylmethane, 2,2-(4,4'-diisocyanato)dicyclohexylpropane, 1,4-diisocyanatobenzene, 2,4- or 2,6-diisocyanatotoluene or mixtures of these isomers, 4,4'- or 2,4'-diisocyanatodiphenylmethane, 2,2-(4,4'-diisocyanato)diphenylpropane, p-xylylene diisocyanate and a,a,a',a'-tetramethyl-m- or -p-xylylene diisocyanate, and mixtures comprising these compounds. to give a prepolymer containing free NCO groups and 2. reacting the prepolymer prepared in step 1 with at least one of the components:
  (E) low molecular weight polyols carrying no further groups which are reactive toward isocyanate groups, these compounds being employed in excess;
  (F) compounds which are monofunctional or contain active hydrogen of differing reactivity, and are different from (E), and optionally
  (G) compounds which are different from (B), (C), (D), (E) and (F) and contain at least two groups which react with NCO groups.

The invention furthermore relates to a process for preparing this coating preparation, and its use as a coating composition.

Polyisocyanate component a) is any organic polyisocyanate having free isocyanate groups which are attached to aliphatic, cycloaliphatic, araliphatic and/or aromatic structures and which is liquid at room temperature. Polyisocyanate component a) has in general a viscosity at 23° C. of from 50 to 20,000 mPa.s. Polyisocyanate component a) is particularly preferably a polyisocyanate or polyisocyanate mixture containing isocyanate groups attached exclusively to aliphatic and/or cycloaliphatic structures and having an (average) NCO functionality of between 2.0 and 5.0.

If required, the polyisocyanates can be used as a blend with small amounts of inert solvents, to reduce the viscosity to a level which is within the stated ranges. However, the amount of such solvents is generally such that a maximum of 30% by weight of solvent is present in the coating compositions according to the invention which In addition to these simple ones, suitable polyisocyanates are also those which contain hetero atoms in the radical linking the isocyanate groups. Examples of these are polyisocyanates containing carbodiimide groups, allophonate groups, isocyanurategroups, urethane groups, acylated urea groups or biuret groups. With regard to other suitable polyisocyanates, reference is made to, for example, DE-A 29 28 552.

Very highly suitable are, for example, "paint polyisocyanates" based on hexamethylene diisocyanate or 1-isocyanato-3,3,5-trimethyl-4-isocyanatomethylcyclohexane (IPDI) and/or bis(isocyanatocyclohexyl)methane, in particular those based exclusively on hexamethylene diisocyanate. The term "paint polyisocyanates" based on these diisocyanates is understood to mean the biuret, urethane, uretdione and/or isocyanurate group-containing derivatives of these diisocyanates, which are known per se and, following their preparation and if required, have been freed in a known manner, preferably by distillation, from excess starting diisocyanate down to a residual content of less than 0.5% by weight. The preferred aliphatic polyisocyanates to be used in accordance with the invention include those polyisocyanates which are based on hexamethylene diisocyanate, contain biuret groups and correspond to the abovementioned criteria, as can be obtained by, for example, the processes of U.S. Pat. Nos. 3,124,605, 3,358,010, 3,903,126, 3,903,127 or 3,976,622 and which are composed of mixtures of N,N,N-tris(6-isocyanatohexyl)biuret with minor amounts of its higher homologs, and also the cyclic trimers of hexamethylene diisocyanate which corresponds to the stated criteria and can be obtained according to U.S. Pat. No. 4,324,879, and are essentially composed of N,N,N-tris(6-isocyanatohexyl)isocyanurate as a mixture with minor amounts of its higher homologs. Of particular preference are mixtures corresponding to the stated criteria and comprising polyisocyanates based on hexamethylene diisocyanate and containing uretdione and/or isocyanurate groups, as are obtained by the catalytic oligomerization of hexamethylene diisocyanate using trialkylphosphanes. Particularly preferred are the last-mentioned mixtures having a viscosity at 23° C. of from 50 to 20,000 mPa. S and an NCO functionality of between 2.0 and 5.0.

The aromatic polyisocyanates, which are likewise suitable according to the invention but are less preferred, are in particular "paint polyisocyanates" based on 2,4-diisocyanatotoluene or its technical-grade mixtures with 2,6diisocyanatotoluene or based on 4,4-diisocyanatodiphenylmethane or its mixtures with its isomers and/or higher homologs. Examples of such aromatic paint polyisocyanates are the isocyanates containing urethane groups, as are obtained by reacting excess amounts of 2,4-diisocyanatotoluene with polyhydric alcohols such as trimethylolpropane, and possible subsequent removal of the unreacted diisocyanate excess by distillation. Further aromatic paint polyisocyanates are, for example, the trimers of the monomeric diisocyanates named by way of example, i.e. the corresponding isocyanato-isocyanurates, which may subsequent to their preparation have been freed from excess monomeric diisocyanates, preferably by distillation.

The polyisocyanate component a) may also comprise any mixture of the polyisocyanates named by way of example.

The polyurethane resin b) possesses in general an average molecular weight $M_n$ (calculated from the stoichiometry of the starting material) of from 1600 to 50,000, preferably from 1600 to 10,000 and in particular from 2000 to 6000, an acid value of from 10 to 80, preferably from 25 to 60 and a hydroxyl number of from 30 to 200, preferably from 35 to 100. It is at least water-dispersible in alkaline medium, and in the case of low molecular weights it is often actually water-soluble under these conditions. In general the molecule chains of this polyurethane resin are predominantly linear, but in some cases a small degree of branching may be present, preferably up to 30% and in particular up to 10%. The gel content is in general less than 5% by weight, preferably less than 1% by weight. On statistical average, each polymer chain preferably contains at least two, and in particular 4 to 6 groups containing active hydrogen, such as amino and/or OH groups.

Suitable polyisocyanates (A) for the construction of the polyurethane resins b ) are the same compounds as described previously for component a), and preferably the diisocyanates mentioned in that context.

The content of polyisocyanates (A) in the polyurethane resin is as a rule from approximately 10 to 50% by weight, preferably from 20 to 35% by weight, based-on the polyurethane resin.

The polyols according to (B) preferably have an average molecular weight $M_n$ of from 400 to 5000, in particular from 800 to 2000. Their hydroxyl number is in general from 30 to 280, preferably from 50 to 200 and in particular from 70 to 160 mg of KOH/g.

Examples of such polyols, which are the compounds known from polyurethane chemistry, are polyether-polyols, polyester-polyols, polycarbonate-polyols, polyesteramidepolyols, polyamido-polyols, epoxy resin polyols and reaction products thereof with $CO_2$, and polyacrylatepolyols etc. Such polyols, which can also be employed as mixtures, are described in, for example, DE-A-20 20 905, 23 14 513 and 31 24 784, and in EP-A-120 466.

Of these polyols, the polyether- and polyester-polyols are preferred, in particular those which contain only terminal OH groups and have a functionality of less than 3, preferably from 2.8 to 2 and in particular 2.

Polyether-polyols which can be mentioned here are, for example, polyoxyethylene-polyols, polyoxypropylenepolyols and polyoxybutylene-polyols, and preferably polyurethane-hydrofurans having terminal OH groups.

The polyester-polyols which are particularly preferred according to the invention are the known polycondensates of di- and optionally poly(tri, tetra)ols and di- and optionally poly(tri, tetra)carboxylic acids or hydroxycarboxylic acids or lactones. Instead of the free polycarboxylic acids, the corresponding polycarboxylic acid anhydrides or corresponding polycarboxylic acid esters of lower alcohols can also be used for preparing the polyesters. Examples of suitable diols are ethylene glycol, butylene glycol, diethylene glycol, triethylene glycol, polyalkylene glycols such as polyethylene glycol, and also propanediol, 1,4-butanediol, 1,6-hexanediol, neopentyl glycol or neopentyl glycol hydroxypivalate, the three last-mentioned compounds being preferred. As polyols which may also be employed, trimethylolpropane, glycerol, erythritol, pentaerythritol, trimethylolbenzene or trishydroxyethyl isocyanurate may be mentioned here by way of example.

Suitable dicarboxylic acids are aromatic and cycloaliphatic dicarboxylic acids and alkyl- and alkenyldicarboxylic acids, and dimeric fatty acids. Examples are: phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, chlorendic acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid, octenylsuccinic acid and dodecenylsuccinic acid. Anhydrides of these acids, where they exist, can also be used.

Consequently, the anhydrides are included in the term "acid". It is also possible to use monocarboxylic acids such as benzoic acid and hexanecarboxylic acid. Saturated aliphatic or aromatic acids, such as adipic acid or isophthalic acid, are preferred. As a polycarboxylic acid which may be used in smaller amounts, trimellitic acid may be mentioned here, and also polyanhydrides as described in DE 28 11 913, or mixtures of two or more such compounds.

The hydroxycarboxylic acids which can be used as reactants in the preparation of a polyester-polyol having terminal hydroxyl include, for example, hydroxycaproic acid, hydroxybutyric acid, hydroxydecanoic acid, hydroxystearic acid and the like. Lactones which can be used include caprolactone, butyrolactone and the like.

The amount of component (B) in the polyurethane resin is usually between 15 and 80% by weight, preferably between 40 and 60% by weight based on the polyurethane resin.

The lower molecular weight polyols (C) employed, if desired, to construct the polyurethane resins generally bring about rigidity of the polymer chain. They have a molecular weight of, in general, from about 60 to 400, preferably from 60 to 200 and hydroxyl numbers of, for example, from 200 to 1500. They may contain aliphatic, alicyclic or aromatic groups. Their amount is in general from 0 to 20% by weight, preferably from 1 to 10% by weight based on the polyol components (B) to (D). Examples which may be mentioned here are lower molecular weight polyols having up to about 20 carbon atoms per molecule, for example ethylene glycol, diethylene glycol, 1,2-propanediol, 1,3-propanediol, 1,4-butanediol, 1,3-butylene glycol, cyclohexanediol, 1,4-cyclohexanedimethanol, 1,6-hexanediol, bisphenol A (2,2-bis(4-hydroxyphenyl)propane), hydrogenated bisphenol A (2,2-bis(4-hydroxycyclohexyl)propane) and mixtures thereof, and trimethylolpropane as a triol.

Compounds suitable as component (D) are described in, for example, US Patents 34 12 054 and 36 40 924 and... in DE-A-26 24 442 and 27 44 544, to which reference is made here. Polyols, preferably diols, which are particularly suitable in this respect are those having at least one carboxyl group and in general from 1 to 3 carboxyl groups per molecule. Suitable groups capable of anion formation include sulfonic acid groups. Examples of such compounds are: dihydroxycarboxylic acids, such as α,α-dialkylolalkanoic acids, in particular α,α-dimethylolalkanoic acids, such as 2,2-dimethylolacetic acid, 2,2-dimethylolpropionic acid, 2,2-dimethylolbutyric acid, 2,2-dimethylolpentanoic acid, tartaric acids, and also polyhydroxy acids, such as gluconic acid. Particularly preferred among these is 2,2-dimethylolpropionic acid. Examples of compounds (D) containing amino groups are α,δ-diaminovaleric acid, 2,4-diaminotoluene-5-sulfonic acid etc. It is also possible to employ mixtures of these compounds (D). The amount of component (D) in the polyurethane resin is in general from 2 to 20% by weight, preferably from 4 to 10% by weight based on the polyurethane resin.

The polyurethane resin employed according to the invention may also contain components (E), which are predominantly, preferably to the extent of from 70 to 90%, located at each of the chain ends and seal them off (chain terminators). Suitable polyols in this respect are those having at least three and preferably 3 or 4 hydroxyl groups. Examples which may be mentioned here are glycerol, hexanetriol, pentaerythritol and trimethylolpropane, the latter being preferred. To be effective as a chain terminator, component (E) is employed in excess based on the isocyanate groups present. The amount of (E) is usually between 2 and 15% by weight, preferably from 5 to 15% by weight based on the polyurethane resin. If appropriate, these components (E) are mixed with components (F) and/or (G) in the polyurethane resin.

The components (F) are derived on the one hand from monofunctional groups which are reactive toward NCO groups, such as monoamines, in particular monosecondary amines, or monoalcohols. Examples of these are: methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl (methyl) aminopropylamine, morpholine, piperidine and/or suitably substituted derivatives thereof, amidoamines constructed from diprimary amines and monocarboxylic acids, monoketimines of all-primary amines, and primary/tertiary amines such as N, N-dimethylaminopropylamine and the like.

Suitable compounds for (F) are preferably those containing active hydrogen which differs in its reactivity towards NCO groups, such as compounds which have secondary amino groups as well as a primary amino group, or COOH groups as well as an OH group, or OH groups as well as an amino group (primary or secondary), the latter compounds being preferred. Examples of these are: primary/secondary amines such as 3-amino-1-methylaminopropane, 3-amino-1-ethylaminopropane, 3-amino-1-cyclohexylaminopropane and 3-amino-1-methylaminobutane; monohydroxycarboxylic acids such as hydroxyacetic acid, lactic acid or malic acid, and also alkanolamines such as N-aminoethylethanolamine, ethanolamine, 3-aminopropanol, neopentanolamine and particularly preferably diethanoiamine.

In this way, additional functional groups are introduced into the polymeric end product, and the latter is thus made more reactive toward materials such as curing agents. The amount of (F) in the polyurethane resin is usually between 2 and 20% by weight, preferably between 3 and 10% by weight based on the polyurethane resin.

The polyurethane resin according to the invention can optionally contain small amounts of components (G), which are derived from so-called chain extenders. These compounds include those known in this context which are reactive with NCO groups and are preferably difunctional, and which are not identical with (B), (C), (D), (E) and (F) and which mostly have average molecular weights of up to 400. Examples of these are water, hydrazine, poly(di)amines such as ethylenediamine, diaminopropane and hexamethylenediamine, which may also carry substituents such as OH groups. Such polyamines are described in, for example, DE-A-36 44 371. The amount of (G) in the polyurethane resin is usually between 1 and 10% by weight, preferably between 2 and 5% by weight based on the polyurethane resin.

The preparation of the polyurethane resin employed in accordance with the invention is preferably carried out by first preparing a polyurethane prepolymer from the polyisocyanates (A), the polyols (B) and if appropriate the low molecular weight polyols (C) and the compounds (D), this prepolymer having on average at least 1.7, preferably from 2 to 2.5, free isocyanate groups per molecule and then being reacted in a non-aqueous system with the compounds (E) and/or (F), optionally mixed with small amounts of (G), with component (E) being employed in stoichiometric excess, and, preferably, finally neutralizing the fully reacted polyurethane resin and transferring it to the aqueous system. If desired, the reaction with (G) can also be carried out after transfer to the aqueous system.

The preparation of the polyurethane prepolymer is carried out according to known processes. The polyisocyanate is employed in excess relative to the polyols (B) to (D) to result in a product having free isocyanate groups. These isocyanate groups are terminal and/or lateral, preferably terminal. It is expedient for the amount of polyisocyanate to be such that the ratio of equivalents of isocyanate groups to the total number of OH groups in the polyols (B) to (D) is from 1.05 to 1.4, preferably from 1.1 to 1.3.

In the preparation of the prepolymer, the reaction is normally carried out at temperatures of from 60° to 95° C., preferably from 60° to 75° C., depending on the reactivity of the isocyanate employed, and as a rule in the absence of a catalyst but preferably in the presence of solvents which are inactive toward isocyanates. Suitable solvents in this respect are in particular those which are compatible with water, such as the ethers, ketones and esters mentioned below and also N-methylpyrrolidone. The amount of this solvent should expediently not exceed 20% by weight, and is preferably in the range from 5 to 15% by weight, in each case based on the sum of polyurethane resin and solvent. It is expedient to add the polyisocyanate to the solution of the remaining components. However it is also possible first to add the polyisocyanate to the polyol (B) and if appropriate (C) and to react the resulting prepolymer with component (D), which is dissolved in a solvent which is inactive towards isocyanates and is preferably N-methylpyrrolidone or a ketone.

The prepolymer or its solution is then reacted with compounds (E) and/or (F), mixed with (G) if appropriate, the temperature expediently being in the range from 50° to 110° C., preferably between 70° and 110° C., until the NCO content in the prepolymer has fallen virtually to zero. If compound (E) is employed, it is added in excess. In this case the amount of (E) is preferably such that the ratio of equivalents of NCO groups in the prepolymer, already reacted beforehand if appropriate with compounds (F) and/or (G), to reactive groups in (E) is 1:1.1 to 1:5, preferably 1:1.5 to 1:3. The amount of (F) and/or (G) here can be from 0 to 90%, preferably from 0 to 20% based on (E).

A proportion of the (unneutralized) COOH groups, preferably from 5 to 30%, can if appropriate be reacted with difunctional compounds which react with COOH groups, such as diepoxides.

To neutralize the resulting product which preferably contains COOH groups, tertiary amines are particularly suitable, for example trialkylamines having from 1 to 12, preferably from 1 to 6 carbon atoms in each alkyl radical. Examples of these compounds are trimethylamine, triethylamine, methyldiethylamine and tripropylamine. The alkyl radicals can also contain, for example, hydroxyl groups, as in the case of the dialkylmonoalkanolamines, alkyldialkanolamines and trialkanolamines. An example of such a compound is dimethylethanolamine, which is used preferably as the neutralizing agent.

Neutralizing agents which can be employed also include, if appropriate, inorganic bases such as ammonia, or sodium or potassium hydroxide.

The neutralizing agent is usually employed in a molar ratio with regard to the COOH groups of the prepolymer of about 0.3:1 to 1.3:1, preferably from about 0.5:1 to 1:1.

The neutralization, which is usually carried out at between room temperature and 110° C., can be performed in any desired manner, for example by adding the water-containing neutralizing agent to the polyurethane resin or vice versa. However, it is also possible first to add the neutralizing agents to the polyurethane resin and only then to add the water. In general this results in solids contents of from 20 to 70%, preferably from 30 to 50%. The content of polyurethane resin in the aqueous coating preparation is in general from 5 to 40% by weight, preferably 15 to 30% by weight based on the overall coating preparation.

In addition to the polyurethane resin, the aqueous coating preparation can also contain as binder up to 60% by weight, preferably up to 30% by weight, based on the polyurethane resin, of other oligomeric or polymeric materials, such as crosslinking, water-soluble or water-dispersible phenolic resins, polyester resins, epoxy resins or acrylic resins etc., as are described in, for example, EP-A-89 497.

In addition excess polyol, corresponding to ( E ), may be present in the coating preparation according to the invention, usually in amounts of from 1 to 10% by weight, preferably from 2 to 5% by weight based on the polyurethane resin.

To produce the ready-to-use coating composition, the polyisocyanate component a) is emulsified in the aqueous dispersion/solution of the polyurethane resin b), the dissolved or dispersed polyurethane resin taking over the function of emulsifier for the polyisocyanate a) added.

Mixing can be carried out simply by stirring at room temperature. The amount of the polyisocyanate component in this mixture is such that the resulting ratio of NCO/OH equivalents, based on the isocyanate groups of component a) and the alcoholic hydroxyl groups of component b), is from 0.5:1 to 5:1, preferably from 0.8:1 to 3:1.

Prior to the addition of the polyisocyanate component a), the assistants and additives conventional in paint technology can be incorporated into the polyurethane resin b), i.e. the dispersion or solution of the polymers. These include, for example, antifoam agents, leveling assistants, pigments and dispersing aids for pigment distribution.

The resulting coating compositions according to the invention are suitable for practically all those areas of application in which solvent-containing, solvent-free or other kinds of aqueous painting and coating systems having an enhanced profile of properties are currently used; the substrates to be coated may consist, example, of metal, mineral construction materials such as chalk, cement or gypsum, fibrated concrete construction materials, concrete, timber or wooden materials, paper, asphalt, bitumen, plastics of various kinds, textiles or leather. As regards the metallic substrates, automobiles are in any case preferred.

Preparation of the binders

Example A

A mixture prepared from 282.8 g of a polyester having a molecular weight of 1020, prepared from adipic acid, 1,6-hexanediol and neopentyl glycol, 42.9 g of dimethylolpropionic acid and 75 g of N-methylpyrrolidone was heated to 100° C. The resulting clear solution was cooled to approximately 60° C. and then, at this temperature, 121.8 g of a mixture of 2,4- and 2,6-tolylene diisocyanate were added dropwise at such a rate that the temperature did not exceed 65° to 70° C. The batch was then stirred at this temperature until the isocyanate value had reached 1.6% (=2 isocyanate groups per molecule). 21.0 g of diethanolamine were then added, the melt remaining readily stirrable. After neutralization with 22.4 g of diethylethanolamine, the finished polyurethane resin was dispersed by adding 625 g of deionized water. A clear, approximately 40% dispersion with a viscosity of 1050 mPas was obtained.

Example B 317.1 g of a polyester having a molecular weight of 1130, prepared from adipic acid, hexanediol, neopentyl glycol and terephthalic acid were mixed with 42.9 g of dimethylolpropionic acid and 90 g of N-methylpyrrolidone, and heated to 100° C. After cooling to 65° C. 183.7 g of 4,4'-diisocyanatodicyclohexylmethane (Desmodur ® W) were added dropwise to the reaction mixture, which was then maintained at 60° C. until a calculated isocyanate value of 1.33% (=2 isocyanate groups per molecule ) had been reached. 80.4 g of trimethylolpropane, followed by 22.8 g of dimethylethanolamine, were added and the batch was stirred for a further 20 min. The polyurethane resin was then dispersed by adding 700 g of deionized water.

Example C 235.6 g of a polyester with a molar mass of 1020, prepared from adipic acid, 1,6-hexanediol and neopentyl glycol were mixed with 56.0 g of polytetrahydrofuran (M=1000), 42.9 g of dimethylolpropionic acid and 75 g of N-methylpyrrolidone and reacted with tolylene diisocyanate (isomer mixture) in the manner described in Example 1. After the prepolymer had been reacted with glycerol, the product was neutralized with 22.8 g of dimethylethanolamine and dispersed with 620 g of deionized water.

Example D 317.1 g of a polyester having a molecular weight of 1130, prepared from adipic acid, hexanediol, neopentyl glycol and terephthalic acid were mixed with 42.9 g of dimethylolpropionic acid and 90 g of N-methylpyrrolidone and heated to 100° C. After cooling to 65° C. 183.7 g of 4,4'-diisocyanatodicyclohexylmethane (Desmodur ® W) were added dropwise to the reaction mixture, which was then maintained at 80° C. until a calculated isocyanate value of 1.33% (=2 isocyanate groups per molecule) had been reached. 21.0 g of diethanolamine, followed by 22.8 g of dimethylethanolamine, were added and the batch was stirred for a further 20 minutes. The polyurethane resin was then dispersed by adding 700 g of deionized water.

2-component primer

To prepare the dispersion batch, 62.6 parts by weight of polyurethane (A), (B) or (C) having a solids content of 40.0% by weight were mixed with 2.4 parts by weight of deionized water, 0.2 part by weight of a commercial silicone-free antifoam (Additol VXW 4973 from Hoechst AG), 0.3 part by weight of a commercial dispersion auxiliary (Additol XL 250 from Hoechst AG) and 0.4 part by weight of a commercial leveling assistant (Additol XW 390 from Hoechst AG). After the additives had simply been stirred in, 14.2 parts by weight of titanium dioxide (Kronos 2310 from Kronos-Titan GmbH), 11.6 parts by weight of a barium sulfate (Blanc fixe micro from Sachtleben GmbH), 3.8 parts by weight of a talc (Naintsch E 7 from Naintsch Mineralwerke GmbH) and 0.1 part by weight of a carbon black (lamp black 101 from Degussa AG) were added to the batch, which was then dispersed for about 30 minutes using a dissolver at a speed of 6000 rpm.

The dispersion batch is then mixed with 12.5 parts by weight of a commercial polyisocyanate (Desmodur N100 or Desmodur N3300 from Bayer AG), and according to the invention has the following composition:

|  | Ex. 1 | Ex. 2 | Ex. 3 |
|---|---|---|---|
| Binder | A | B | C |
|  | 25.04 | 25.04 | 25.04 |
| Pigment | 29.70 | 29.70 | 29.70 |
| Assistants | 0.55 | 0.55 | 0.55 |
| Total solids | 55.29 | 55.29 | 55.29 |
| Water, deionized | 39.98 | 40.20 | 40.79 |
| Org. solvent | 4.73 | 4.51 | 3.92 |
| Total | 100.00 | 100.00 | 100.00 |

The ready-to-process batches have an organic solvent content of only from 3.92 to 4.73% by weight. The coatings are applied to the substrate in a wet film thickness of from 150–300 μm (corresponding to a dry film thickness of from 25 to 50 μm) and dried for 30 minutes at 80° C. in a circulating-air oven. The curing process is complete after 7 to 14 days.

The cured films of Examples 1 to 3 can be characterized as follows:

| Solvent resistance | Ex. 1 | Ex. 2 | Ex. 3 |
|---|---|---|---|
| Isopropanol | good | good | good |
| Isopropanol/water (1:) | good | good | moderate-good |
| Ethanol | very good | good | good |
| Ethanol/water (1:1) | very good | very good | moderate-good |
| Premium gasoline | good | good | very good |
| Water | good | very good | good |
| Pendulum hardness according to DIN 53157 | 50"–75" | 81"–110" | 80"–100" |
| 60° gloss according to DIN 67530 | 83% | 80% | 85% |
| Tropical-type climate test according to DIN 50017 SK | good | very good | good |
| Salt spray test according to ASTM-B117-69 | good | very good | good |
| Top coat appearance | good-moderate | good-moderate | very good |
| Stone chip/adhesion/penetrations | good very good | good very good | good very good |

2-component top coat

To prepare the dispersion batch, 67.6 parts by weight of polyurethane (B) or (D) having a solids content of 40.0% by weight are mixed with 2.9 parts by weight of deionized water, 0.2 part by weight of a commercial silicone-free antifoam (Additol VXW 4973 from Hoechst AG), 0.3 part by weight of a commercial dispersion auxiliary (Additol XL 250 from Hoechst AG) and 0.4 part by weight of a commercial leveling agent (Additol XW 390 from Hoechst AG). After the additives had simply been stirred in 24.6 parts by weight of titanium dioxide (Kronos 2310 from Kronos-Titan GmbH) are added to the batch and it is dispersed with a dissolver for approximately 30 minutes at a speed of 6000 rpm.

The dispersion batch is then mixed with 13.4 parts by weight of a commercial polyisocyanate (Desmodur N100 or Desmodur N3300 from Bayer AG), and according to the invention has the following composition:

| Ex. 4/Ex. 5 | Ex. 4 | Ex. 5 |
| --- | --- | --- |
| Binder | D | B |
|  | 26.88 | 26.88 |
| Pigment | 24.60 | 24.60 |
| Assistants | 0.55 | 0.55 |
| Total solids | 52.03 | 52.03 |
| Water, deionized | 43.25 | 43.25 |
|  | 4.72 | 4.72 |
| Total | 100.00 | 100.00 |

The ready-to-process batches have an organic solvent content of only 4.72% by weight. The coatings are applied to the substrate in a wet film thickness of from 200–400 μm (corresponding to a dry film thickness of from 30 to 60 μm) and dried for 30 minutes at 80° C. in a circulating-air oven. The curing process is complete after 7 to 14 days.

The cured films of Examples 4 to 5 can be characterized as follows:

| Solvent resistance | Ex. 4 | Ex. 5 |
| --- | --- | --- |
| Isopropanol | good | good |
| Isopropanol/water (1:1) | good | very good |
| Ethanol | good | good |
| Ethanol/water (1:1) | good | very good |
| Premium gasoline | good | good |
| Water | good | good |
| Pendulum hardness according to DIN 53157 | 80" | 95" |
| 60° gloss according to DIN 67530 | 78% | 80% |
| Tropical-type climate test according to DIN 50017 SK | good | good-very good |
| Salt spray test according to ASTM-B117-69 | good-very good | very good |
| Top coat appearance | moderate | good-moderate |
| Stone chip/adhesion /penetrations | good-very good very good | good-very good very good |

2-component sanding filler

To prepare the dispersion batch, 32.3 parts by weight of polyurethane (B) or (D) having a solids content of 40.0% by weight are mixed with 19.2 parts by weight of deionized water, 0.28 part by weight of a commercial silicone-free antifoam (Additol VXW 4973 from Hoechst AG), 0.42 part by weight of a commercial dispersion auxiliary (Additol XL 250 from Hoechst AG) and 0.55 part by weight of a commercial leveling agent (Additol XW 390 from Hoechst AG). After the additives had simply been stirred in, 1.4 parts by weight of iron oxide (Bayferrox 3920 from Bayer), 0.42 part by weight of aerosil (Aerosil 380 from Degussa AG), 18.4 parts by weight of a commercial titanium dioxide (Kronos 2310 from Kronos-Titan GmbH), 17.0 parts by weight of a barium sulfate (Blanc fixe micro from Sachtleben) and 16.22 parts by weight of kaolin (Kaolin W from Erbslöh) are added to the batch, which is dispersed for approximately 30 minutes using a dissolver at a speed of 6000 rpm. The dispersion batch is then mixed with 6.47 parts by weight of a commercial polyisocyanate (Desmodur N100 or Desmodur N3300 from Bayer AG) which has been previously diluted with 4.83 parts by weight of butyl acetate, and according to the invention has the following composition:

| Ex. 6/Ex. 7 | Ex. 6 | Ex. 7 |
| --- | --- | --- |
| Binder | B | D |
|  | 12.93 | 12.93 |
| Pigment | 53.50 | 53.50 |
| Assistants | 0.77 | 0.77 |
| Total solids | 67.20 | 67.20 |
| Water, deionized | 30.21 | 30.21 |
| Organic solvent | 2.59 | 2.59 |
| Total | 100.00 | 100.00 |

The ready-to-process batches have an organic solvent content of only 2.59% by weight. The coatings are applied to the substrate in a wet film thickness of from 300–500 μm (corresponding to a dry film thickness of from 70 to 120 μm) and dried for 30 minutes at 80° C. in a circulating-air oven. The curing process is complete after 7 to 14 days.

The cured films of Examples 6 to 7 can be characterized as follows:

| Solvent resistance | Ex. 6 | Ex. 7 |
| --- | --- | --- |
| Isopropanol | good-moderate | good-moderate |
| Isopropanol/water (1:1) | good-very good | good |
| Ethanol | good | good |
| Ethanol/water (1:1) | good | good |
| Premium gasoline | good | good-moderate |
| Water | good-moderate | good-moderate |
| Pendulum hardness according to DIN 53157 | 70"-100" | 65"-85" |
| 60° gloss according to DIN 67530 | 2% | 2% |
| Tropical-type climate test according to DIN 50017 SK | good-very good | good |
| Salt spray test according to ASTM-B117-69 | good-very good | good |
| Top coat appearance | good | very good |
| Stone chip/adhesion /penetrations | very good-good good | very good-good good |

The cured films from all the examples are tested in accordance with the following test procedures:
Pendulum hardness: in accordance with DIN 53 157
Degree of gloss: in accordance with DIN 67 530, measured at an angle of 60°
Tropical-type in accordance with DIN 50 017, climate test SK. After 240 hours at an atmospheric humidity of 100% and a temperature of 40° C., blistering, gloss and the constitution of the coated surface were subjectively assessed according to a ratings scale (1=very good, 5=very poor).

Salt spray test: in accordance with ASTM-B 117-69. After 240 hours in a salt mist climate, blistering and corrosive penetration at the predetermined corrosion points were subjectively assessed according to a ratings scale (1 =very good; 5=very poor).

Top coat appearance: the gloss and surface of the top coat were subjectively assessed according to a ratings scale (1=very good, 5=very poor).

Stone chip: the stone-chip resistance was tested using a stone chip tester in accordance with the VDA [German Automobile Manufacturers Association] (from Erichsen, model 508).

For each of these tests, 1 kg of steel shot (angular, 4 to 5 mm) was fired against the metal test panels under acceleration by means of compressed air (2 bar). Using sample panels, an assessment was made of the top coat adhesion (very good=no signs of detachment, very poor=complete removal) and of the penetrations down to the metal (very good=no penetrations, very poor=a large number of penetrations).

We claim:

1. A water-thinnable two-component coating preparation comprising
a) a polyisocyanate component comprising one or more organic polyisocyanates, and
b) a polyurethane resin prepared by
  1. reacting
    (A) polyisocyanates with
    (B) polyols having an average molecular weight $M_n$ of at least 400, and
    (D) compounds having at least two groups which are reactive toward isocyanate groups and at least one group which is capable of anion formation, to give a prepolymer containing free NCO groups and
  2. reacting the prepolymer prepared in step 1 with at least one of the components:
    (E) low molecular weight polyols carrying no further groups which are reactive toward isocyanate groups, these compounds being employed in excess;
    (F) compounds which are monofunctional or contain active hydrogen of differing reactivity, and are different from (E), 2. A process for preparing a coating preparation as claimed in claim 1, which comprises reacting
  (A) polyisocyanates with
  (B) polyols having an average molecular weight $M_n$ of at least 400,
  and
  (D) compounds having at least two groups which are reactive toward isocyanate groups and at least one group which is capable of anion formation, to give a prepolymer containing free NCO groups and
  2. reacting the prepolymer prepared in step 1 with at least one of the components:
    (E) low molecular weight polyols carrying no further groups which are reactive toward isocyanate groups, these compounds being employed in excess;
    (F) compounds which are monofunctional or contain active hydrogen of differing reactivity, and are different from (E)
  to give a polyurethane resin containing active hydrogen,
  3. dispersing or dissolving this polyurethane resin in water and optionally adding auxiliaries and additives to it, and
  4. emulsifying in this solution or dispersion a polyisocyanate component composed of at least one organic polyisocyanate, the quantity ratios of the resin to the isocyanate component corresponding to a ratio of equivalents of NCO to OH, based on the isocyanate groups of the polyisocyanate component and the incorporated OH hydroxyl groups of the resin component, of from 0.5:1 to 5:1.

3. The water-thinnable two component coating preparation of claim 1 wherein in step 1 of the preparation of the polyurethane resin, a low molecular weight polyol (C) is used together with components (A), (B) and (D).

4. The water-thinnable two component coating preparation of claim 1 wherein in step 2 of the preparation of the polyurethane resin, compounds (G) which are different from (B), (C), (D), (E), and (F), and contain at least two groups reactive towards NCO groups are used together with compounds (E) and (F).

5. The water-thinnable two component coating preparation of claim 4 wherein in step 1 of the preparation of the polyurethane resin, a low molecular weight polyol (C) is used together with components (A), (B) and (D).

6. The process of claim 2 wherein in step 2 of the preparation of polyurethane resin, a low molecular weight polyol (C) is used together with components (A), (B) and (D).

7. The process of claim 2 wherein in step 2 of the preparation of the polyurethane resin, compounds (B) which are different from (B), (C), (D), (E) and (F), and contain at least two groups reactive towards NCO groups are used together with compounds (E) and (F).

8. The process of claim 7 wherein in step 1 of the preparation of the polyurethane resin, a low molecular weight polyol (C) is used together with components (A), (B) and (D).

9. A coating on a substrate formed with a coating composition of claim 4.

10. A coating on a substrate formed with a coating composition of claim 4.

11. A coating on a substrate formed with a coating composition of claim 3.

* * * * *